Feb. 25, 1969

L. A. MICALLEF 3,429,488

SURGE-PROOF POURING DEVICE

Filed April 12, 1967

INVENTOR:
LEWIS A. MICALLEF,
BY *Ernest F. Marmorek*
HIS ATTORNEY.

United States Patent Office 3,429,488
Patented Feb. 25, 1969

3,429,488
SURGE-PROOF POURING DEVICE
Lewis A. Micallef, New York, N.Y., assignor to Leeds & Micallef, New York, N.Y., a partnership of New York
Filed Apr. 12, 1967, Ser. No. 630,792
U.S. Cl. 222—570       14 Claims
Int. Cl. B65d 25/52

ABSTRACT OF THE DISCLOSURE

A surge proof pouring device, for use in lieu of the conventional closure of tubular pouring outlets of containers, for example bottles. The pouring device comprises a shock absorbing chamber which receives liquid rushing from the container into the chamber when the container and pouring device are tilted for pouring liquid from the container. A closure member is provided for closing the annular passage; the pouring device and the closure member have mating cams which guide the closure member for axial movement relative to the pouring device.

---

The invention relates to a surge proof pouring device for replacing the regular closure member of a tubular pouring outlet of a container for liquids, for example, a bottle.

It is known that when pouring liquid into a receptacle from a container having a tubular pouring outlet, the liquid rushes at great speed to and through the pouring outlet into the receptacle, particularly, if the container is not completely full. If the receptacle is relatively small, the liquid splashes in the receptacle and over its rim unless the bottle is very carefully handled and the liquid is poured very slowly. A busy person having to pour a liquid such as whiskey or salad oil into a great number of receptacles in a short time cannot afford such slow and careful pouring and much of the liquid may be spilled during the process.

Bottle stoppers or adaptors have been proposed which control the flow of liquid when pouring it through a tubular outlet of a container. These conventional devices control the direction of flow of the liquid and/or have a throttling effect on the liquid for avoiding splashing. Devices of this type do not, however, counteract the surging of the liquid toward the outlet, particularly when the liquid container is only partly filled and/or too quickly tipped. Conventional devices which produce a throttling effect slow the pouring operation.

It is accordingly among the principal objects of the invention to provide a surge proof pouring device which can be applied to the tubular outlet of a container for liquid in lieu of a regular removable closure element. The pouring device is so shaped as to destroy the energy of a surge wave rushing into the outlet, while permitting gentle flow of the liquid through the device to the outside. The surge proof pouring device according to the invention consists of one part only which can be manufactured easily and inexpensively.

It is another object of the invention to provide such a surge proof device with a movable releasable closure member.

It is a further object of the invention to provide such a surge proof device with a closure member for releasably sealing the pouring device and for wiping off any residue of poured liquid that may adhere to the pouring device.

It is still another object of the invention to provide for such releasable sealing in the closure position of the closure member, and for an annular pouring opening in all other positions.

With the above and other objects of the invention in view, the invention consists in the novel construction, arrangement and combination of various devices, elements and parts, as set forth in the claims hereof, certain embodiments of the same being illustrated in the accompanying drawings and described in the specification.

The novel features which are considered characteristic of the invention are set forth with particularity in the appended claims. The invention itself, however, and additional objects and advantages thereof will best be understood from the following description of embodiments thereof when read in connection with the accompanying drawings, wherein:

Figure 1:
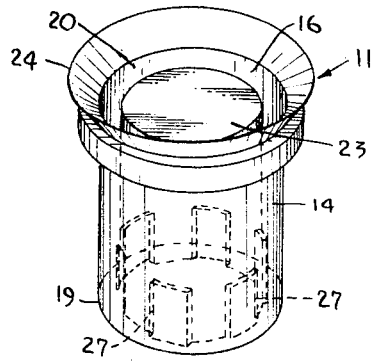
FIG. 1 is a perspective view of a spurge proof pouring device according to the invention.
Figure 2:
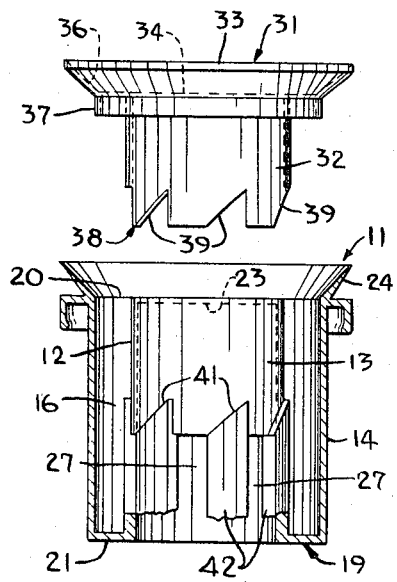
FIG. 2 is an exploded elevational view, partly in central section, of a modified pouring device and a closure member for use with the pouring device.
Figure 3:
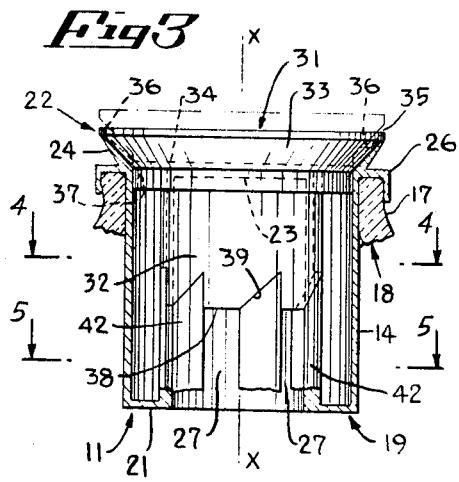
FIG. 3 is an elevational view, partly in section, of the pouring device of FIG. 2 with the closure member emplaced thereon.

In carrying the invention into effect in the embodiments which have been selected for illustration in the accompanying drawings and for description in this specification, and referring now particularly to FIGS. 1–4, there is provided a tubular means generally indicated at 11. The tubular means 11 comprises an inner tubular element 12 that defines on its interior a shock absorbing chamber 13. The tubular means 11 furthermore comprises an outer tubular member 14 that is placed concentrically around the tubular element 12 and defines therewith an annular pouring passage 16. The pouring passage 16 thus is disposed concentrically around the tubular element 12. The tubular member 14, as best shown in FIG. 3, is adapted to fit snugly into the tubular pouring outlet 17 of a container 18, such as the neck 17 of a bottle 18.

The tubular means 11 comprises a first or rear end portion generally indicated at 19. An annular rear end wall 21 is provided at the rear end portion 19 and is connected, preferably integrally connected, to the outer tubular member 14 and to the inner tubular element 12. The tubular means 11 is unobstructedly open in the rear so that no foreign material or object will be retained therein.

The tubular means 11 has a second or front end portion generally indicated at 22. A circular front end wall 23 is provided at the front end portion 22 and preferably is integral with the tubular element 12 and terminates frontwardly the shock absorbing chamber 13. An annular lip 24 is provided at the front end portion 22 and preferably is integral with the tubular member 14 and is disposed adjacent a container 18 engaging annular channel 26 of the tubular member 14.

The tubular member 14 that surrounds the pouring passage 16 is open at the front end, thereby providing an open front outlet end 20 for the pouring passage 16.

In accordance with a preferred embodiment, as previously indicated, the entire tubular means 11, including the tubular element 12, tubular member 14, end walls 21 and 23, lip 24 and channel 26, is made of a single piece of material. This may be a synthetic plastic material, for instance polyvinyl or polyethylene, or any other suitable material that is stainless and sufficiently solid to retain substantially its shape and at the same time sufficiently flexible to permit insertion of the tubular member 14 into the neck 17 of the bottle 18, within the usual tolerances for the fitting of stoppers into a bottle.

As best shown in FIG. 3, the channel 26 engages the top of the bottle 18. The engagement is such that the tubular means 11 may rotate on the neck 17 of the bottle 18, but will resist removal therefrom except upon the exertion of considerable force.

The inner tubular element 12 is provided near the rear end portion 19 with apertures or slots or ports 27 that extend for a predetermined distance frontwardly from the rear end portion 19, and have a certain predetermined width. These ports 27 serve to connect the shock absorbing chamber 13 with the interior of the pouring passage 16. The shock absorbing chamber thus is closed at the front end portion 22 by the wall 23, and is open at the rear end portion 19 towards the interior of the bottle 18, and communicates by means of the ports 27 with the pouring passage 16; the pouring passage 16, on the other hand, is open at 20 at the front end, but closed at the rear by the rear end wall 21 except for the ports 27; both the shock absorbing chamber 13 and the pouring passage 16 communicate interiorly with the inside of the bottle 18.

Thus, when the container 18 and the tubular means 11 inserted thereon are tilted, liquid will rush from the container into the shock absorbing chamber 13, splashing against the front end wall 23 of the tubular element 12, whereby any surge effect is absorbed in the chamber 13. The liquid will flow through the ports 27 into the annular pouring passage 16, wherefrom it can be discharged in a gentle flow that is unaffected by the preceding surge caused by a quick tipping of the container 18.

The lip 24 is connected to, and flares outwardly near, the open front end of the tubular member 14 that surrounds the pouring passage 16. The lip 24 preferably is resilient, and promotes a drip free pouring and drip free discontinuation of the pouring of the liquid out of the bottle 18 and through the tubular means 11 and flowing through the pouring passage 16 to the lip 24.

Figure 4:
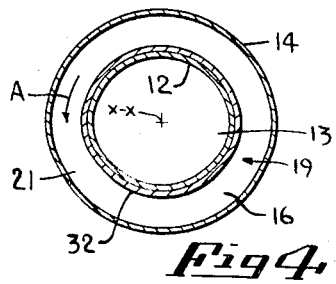
FIG. 4 is a sectional view taken on the line 4—4 of FIG. 3.

As best shown in FIGS. 2, 3 and 4, a closure member, generally indicated at 31 is provided for releasably closing the pouring passage 16. The closure member 31 comprises a tubular portion 32 that is rotatably and axially movably fitted around the tubular element 12.

The closure member 31 comprises a second or front end portion 33 that includes a dished end wall 34 that terminates laterally in a tapered annular collar 36, and the wall 34 is furthermore provided opposite said collar 36 with a flange 37.

The collar 36 is of annular shape that flares outwardly in conformity with the lip 24, and is adjacent the lip 24 when the closure member 31 is in the closed position as shown in solid lines in FIG. 3. The collar 36 forms sealing means which are adapted to wipe off any residue of poured liquid, such as salad oil, that may adhere to the pouring lip 24 when the closure member 31 is put into the closure position (solid lines, FIG. 3). This is an important advantage of the instant invention, in that it not only provides for sealing, but at the same time for the hygienic protection of first wiping the lip 24 clean before sealing it.

The flange 37, shown in FIGS. 2 and 3, is not a necessary, though a desirable, feature that partakes in the sealing. The flange 37 aids in closing the open front end outlet 20 of the pouring passage 16.

The tubular portion 32 near its lower free end 38 is provided with cam surfaces 39, for instance of the shape of spaced apart saw teeth; and the tubular means 11 has mating cam surfaces 41. The cam surfaces 39 and 41 are so shaped as to cause axial movement of the closure member 31, when the closure member 31 is rotated in at least one rotational direction about the axis X—X (FIGS. 3, 4) that is the central axis for both the tubular means 11 and the closure member 31 when placed about the tubular element 12. Thus, when the closure member 31 is rotated in the direction of the arrow A (FIG. 4), the interaction of the cams 39 and 41 will cause the closure member 31 to be raised as compared to the tubular means 11 into a forward pouring position indicated in broken lines in FIG. 3. In that pouring position, the collar 36 will form with the lip 24 a tapered discharge passage 35 for the liquid. Turning of the closure member 31 in the opposite direction and simultaneously pushing rearwardly, will result in the closure member moving from the pouring position (broken lines, FIG. 3) into the rearward closure position (solid lines, FIG. 3). When the cam surfaces 39 and 41 are mating, rotation in the direction A of the closure member 31 will result in an automatic forward movement of the closure member 31; rotation of the closure member 31 in the opposite direction, however, requires simultaneous rearward pushing to return it to the rearward closure position.

Controlled axial movement of the closure member 31 to open the front end 20 of the annular pouring passage 16 is not always possible, particularly when the inner surface of the tubular portion 32 adheres to the outer surface of the tubular element 12. The resistance caused by sticking can be overcome by turning or twisting the closure member 31. It is difficult, however, to combine a desired axial movement of the closure member 31 with the turning movement thereof. In order to effect a controlled combination of rotating and axial movements, namely a screwing movement, the aforesaid mating cam surfaces 39 and 41 have been provided. They have a plurality of axially extending teeth with inclined surfaces and circular portions therebetween. When the closure member 31 is in closing position (solid lines, FIG. 3), the mating cam surfaces 39 and 41 fully engage with one another. A twisting movement (direction A) of the closure member 31 causes riding up of its cam surfaces 39 on the cam surfaces 41, and outward movement of the closure member whereby the collar 36 and the flange 37 are separated from the tubular means 11, and surge free liquid can be poured through the discharge passage 35 between the collar 36 and the lip 24. Turning of the closure member 31 in the opposite direction and a slight axial inward pressure exerted thereon, however, causes riding down of the cam surfaces 39 on the cam surfaces 41 and closing of the discharge passage 35. It is obvious that the structure according to the invention is very simple and requires only a natural screw-down or screw-up manipulation for closing or opening the surge proof pouring device according to the invention to liquid flow.

Figure 5:
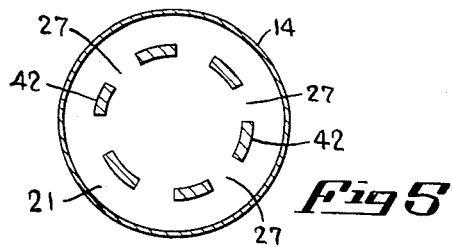
FIG. 5 is a sectional view taken on the line 5—5 of FIG. 3.

In accordance with a preferred embodiment, the cams 42 that provide the cam surfaces 41 are preferably so positioned as to be interrupted at the positions of the ports 27, as best shown in FIGS. 2 and 5.

The cams 42 preferably are molded in one piece with the remainder of the tubular means 11. This integral arrangement, however, is not necessary, and the cams 42 may be separate from the tubular element 12 and be placed near the external circumference of the tubular element 12; this affords the possibility of converting a pouring device without closure member into one for use with a closure member.

In the embodiment of FIGS. 2–5, the lip 24, as previously indicated, is preferably resilient, to such an extent that a good sealing will be provided when the collar 36 of the closure member 31 is pressed against the lip 24 in the threading movement occasioned by the interengaging cam surfaces 39 and 41 when the closure member 31 is moved to the closed position.

Figure 6:
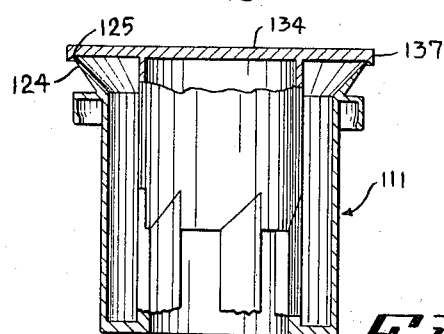
FIG. 6 is an elevational view, partly in section, similar to FIG. 3 but embodying a modification and showing the closure member in closed position.
Figure 7:
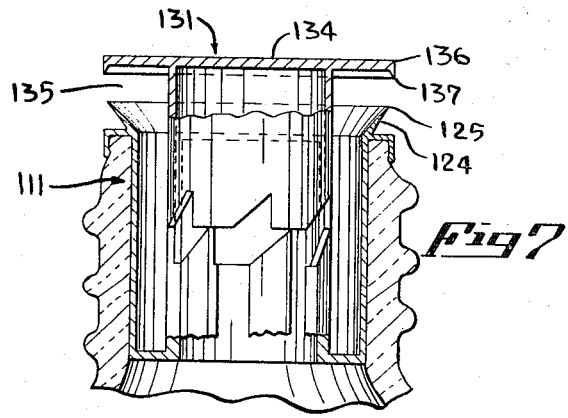
FIG. 7 is an elevational view, partly in section, similar to FIG. 6 but showing the closure member in open position.

In the modification of FIGS. 6 and 7, however, the pouring lip 124 lends itself to a different type of sealing. The remaining parts of the tubular means 111 are similar to those of FIGS. 2–5.

The closure member 131 of FIGS. 6 and 7, in contrast to the closure member of FIGS. 2–5, no longer has a dished end wall but instead is provided with a flat end wall 134. The collar 136 does not flare outwardly in tapered fashion, but is flat, and the flange 137 in this modification serves to engage in the closed position the upper edge 125 of the lip 124, as best shown in FIG. 6. In all other positions, as shown in FIG. 7, the collar 136 forms with the lip 124 an annular discharge passage 135.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A surge proof pouring device, for use in connection with a container and adapted to be removably fitted to said container, said pouring device comprising a portion adapted substantially to line a part of said container and including means establishing a shock absorbing chamber permanently closed in front and unobstructedly open in the rear thereby communicating with the interior of the container and a pouring passage formed in said portion connected for liquid flow near the rear to said shock absorbing chamber and being closed thereagainst throughout its remainder.

2. A surge proof pouring device as defined in claim 1, said pouring device being made of a single piece of material.

3. A surge proof pouring device as defined in claim 1, said means comprising a tubular element defining said shock absorbing chamber, said tubular element having an open first rear end placed so as to be adapted for receiving liquid directly from the container and having a permanently closed second front end for stopping the liquid surging thereagainst when the container and the pouring device are tipped for pouring liquid.

4. A surge proof pouring device according to claim 3, wherein said pouring passage is of annular cross section and disposed concentrically around said tubular element.

5. A surge proof pouring device according to claim 3, comprising a plurality of ports in said tubular element connecting the rear of said shock absorbing chamber for liquid flow with said pouring passage.

6. A surge proof pouring device according to claim 5, wherein said ports are placed in the vicinity of said open first end of said tubular element.

7. A surge proof pouring device according to claim 3, wherein said portion comprises a tubular member disposed concentrically around said tubular element and defines therewith said pouring passage.

8. A surge proof pouring device according to claim 7, wherein said tubular member has an open end at the outlet of said pouring passage, a flared annular lip concentrically connected to said open end of said tubular member for controlling the flow of the poured liquid.

9. A surge proof pouring device as defined in claim 1, wherein said pouring passage has a frontal outlet end, and a closure member is provided for closing said outlet end.

10. A surge proof pouring device according to claim 9, wherein said means comprises a tubular element that defines said shock absorbing chamber, said tubular element having an open first rear end receiving liquid directly from the container and having a closed second front end operable for stopping the liquid surging thereagainst when the container and the pouring device are tipped for pouring liquid, said pouring passage being of annular cross section and disposed concentrically around said tubular element, said closure member comprising a tubular element, said closure member comprising a tubular portion rotatably and axially movably fitted around said tubular element.

11. A surge proof device according to claim 10, comprising cam means connected to said tubular portion of said closure member, and cam means connected to said tubular element, said cam means comprising mating cam surfaces so shaped as to cause axial movement of said closure member when said closure member is rotated in at least one rotational direction, thereby permitting said closure member to move to and from a closure position relative to said tubular means.

12. A surge proof pouring device according to claim 10, wherein said means comprises a tubular member disposed concentrically around said tubular element and defines therewith said pouring passage and has an open end at the outlet of said pouring passage, a flared annular lip being concentrically connected to said open end of said second tubular element, said closure member comprising a tubular portion rotatably and being axially movably fitted around said first tubular element, a collar being provided around the end of said tubular portion near the outlet of said pouring passage, said collar comprising annular sealing means operable to close said open end.

13. A surge proof pouring device according to claim 12, said sealing means including a flared annular portion conformed to said annular lip and adjacent thereto when said closure member is in closing position, thereby adapted for wiping off any residue of poured liquid that may adhere to the pouring lip when said closure member is put into the closure position.

14. A surge proof pouring device according to claim 12, said sealing means including a flange engaging the terminal edge of said annular lip in the closed position and, respectively, forming an annular discharge passage therewith in all other positions.

References Cited

UNITED STATES PATENTS

| 3,311,275 | 3/1967 | Gibson | 222—564 |
| 3,330,450 | 7/1967 | Clare | 222—564 |

FOREIGN PATENTS 1,076,530   10/1954   France.

ROBERT B. REEVES, *Primary Examiner.*

H. S. LANE, *Assistant Examiner.*